(12) United States Patent
Miller et al.

(10) Patent No.: US 11,750,079 B2
(45) Date of Patent: Sep. 5, 2023

(54) VOLTAGE REGULATION MODULE WITH ADAPTIVE SPARE CONVERTERS

(71) Applicant: International Business Machines Corporation, Armonk, NY (US)

(72) Inventors: Michael Lee Miller, Rochester, MN (US); Eric B. Swenson, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/117,196

(22) Filed: Dec. 10, 2020

(65) Prior Publication Data

US 2022/0190705 A1     Jun. 16, 2022

(51) Int. Cl.
| | |
|---|---|
| *H02J 9/06* | (2006.01) |
| *H02M 1/08* | (2006.01) |
| *G06F 1/28* | (2006.01) |
| *G06F 1/30* | (2006.01) |
| *H02M 1/00* | (2006.01) |

(52) U.S. Cl.
CPC ............. *H02M 1/08* (2013.01); *G06F 1/28* (2013.01); *G06F 1/30* (2013.01); *H02J 9/068* (2020.01); *H02M 1/0067* (2021.05)

(58) Field of Classification Search
CPC ............ H02J 9/068; H02J 9/061; H02H 3/05; H02M 1/008; H02M 1/067; H02M 1/08; G06F 1/28; G06F 1/30
See application file for complete search history.

(56) References Cited

U.S. PATENT DOCUMENTS

| | | | |
|---|---|---|---|
| 6,275,958 B1 * | 8/2001 | Carpenter | H02M 3/158 714/48 |
| 6,836,100 B2 | 12/2004 | Egan et al. | |
| 6,894,405 B2 * | 5/2005 | Yuan | G06F 1/263 714/22 |
| 7,443,055 B2 | 10/2008 | Pracht et al. | |
| 7,895,455 B2 | 2/2011 | Green et al. | |
| 9,189,040 B2 | 11/2015 | Phadke et al. | |
| 9,742,198 B2 | 8/2017 | Barus et al. | |
| 9,812,990 B1 | 11/2017 | Cheng et al. | |

(Continued)

FOREIGN PATENT DOCUMENTS

| | | |
|---|---|---|
| EP | 2210159 B1 | 9/2017 |
| WO | 2020194119 A1 | 10/2020 |
| WO | 2020194120 A1 | 10/2020 |

OTHER PUBLICATIONS

Lopez et al., "Redundancy and Basic Switching Rules in Multilevel Converters," Research Gate, International Review of Electrical Engineering, Jan. 2006, 11 pages.

*Primary Examiner* — Harry R Behm
(74) *Attorney, Agent, or Firm* — Peter J. Edwards

(57) ABSTRACT

A VRM system comprises a first output group that comprises a first primary converter. The VRM system also comprises a second output group that comprises a second primary converter. The VRM system also comprises a first VRM output and a second VRM output. The VRM system comprises an adaptable spare converter. The VRM system comprises a first switch and a second switch. Closing the first switch connects the adaptable spare converter with the first VRM output. Closing the second switch connects the adaptable spare converter with the second VRM output.

24 Claims, 9 Drawing Sheets

(56) References Cited

U.S. PATENT DOCUMENTS

| | | |
|---|---|---|
| 10,566,903 B1 | 2/2020 | Miller et al. |
| 10,606,295 B1 | 3/2020 | Miller et al. |
| 10,615,691 B1 | 4/2020 | Miller et al. |
| 10,739,803 B1 | 8/2020 | Miller et al. |
| 2007/0035899 A1* | 2/2007 | Covi .................. H02M 3/1584 361/56 |
| 2007/0174698 A1* | 7/2007 | Bailey ....................... G06F 1/28 714/22 |
| 2008/0093933 A1* | 4/2008 | Pracht ................. H05K 1/0262 307/116 |
| 2011/0051479 A1 | 3/2011 | Breen et al. |
| 2015/0301124 A1* | 10/2015 | Bulur ..................... G01R 31/52 324/754.03 |
| 2019/0296654 A1 | 9/2019 | Azidehak et al. |

* cited by examiner

VOLTAGE REGULATION MODULE WITH ADAPTIVE SPARE CONVERTERS

BACKGROUND

The present disclosure relates to voltage regulation modules, and more specifically, to redundant converters in voltage regulation modules.

Some computer systems contain a single power-input source that provides power at one or two voltages. Such a power supply may be responsible for providing the power that is eventually output to all components of the computer system. Some of these components, however, may have very strict requirements regarding the properties of the power that is provided to them. Some components require that power be delivered within narrow voltage ranges, and may also have low tolerance for power instabilities, such as voltage ripple. Some components can also very quickly change the amount of current that is required for those components' operations, and thus require that a power source be able to quickly ramp up or ramp down power without dropping or spiking voltage.

For these and other reasons, some computer systems utilize voltage regulation modules (sometimes referred to herein as "VRMs") to convert power that is input into the system into a form that meets the requirements of that system's components. In some computer systems, several components with different power requirements may each have their own dedicated VRM. VRMs for particularly sensitive or important components may be composed of multiple power phases, each of which share the responsibility of delivering power to those components. For example, a VRM that outputs 4.5V power to a processor may be composed of 8 phases, whereas a VRM that outputs 1.2V power to a memory module may be composed of two phases. Each of these phases may include the components necessary to output stable power, and may be controlled by a dedicated controller or a controller shared between multiple phases.

In some use cases, extremely high uptime is particularly important to a user of a computer system. In these use cases, the VRM systems may be designed to incorporate redundant VRM components in case a portion of the VRM fails. It is possible to provide redundancy to a VRM by adding extra power phases to the VRM, such that the VRM controller can switch to controlling a backup phase when a phase in the VRM fails. However, causing a controller to switch from a failed phase to a backup phase can require opening and closing a large number of switches, which oftentimes need to be switched simultaneously or nearly simultaneously in order to avoid downtime of the VRM. Further, if a VRM's VRM controller fails, backup phases cannot be utilized to recover the VRM, and the VRM would need replacement.

To address the switching issue, it is also possible to provide redundancy in a VRM by assigning a dedicated backup phase to each output of a VRM. For example, a two-phase VRM for a memory may have a dedicated backup phase that can be switched in if either of the two primary phases fails, and an eight-phase VRM for a graphics processor unit may have three dedicated backup phases that can be switched in if any of the eight primary phases fails. This can lead to simpler switching in of the backup phase, but switching the phase controlled by a VRM controller does still add time and complexity to the failover process. Further, this design does not address the previously stated issue of potential VRM controller failure; if the VRM controller itself fails, the VRM would not be able to provide power output even if all phases were otherwise functional.

To address these issues, it is also possible to provide redundancy in a VRM by incorporating each primary phase of the VRM, and each dedicated backup phase, into a full converter. In other words, each phase of the VRM can be paired with a dedicated VRM controller. If, in these VRMs, a phase fails or that phase's dedicated controller fails, the entire converter (i.e., the phase and the phase's dedicated VRM controller) can be isolated and replaced with a backup converter. If that backup converter also has a dedicated VRM controller paired to the backup phase, switching can be performed more simply. Further, the failure of a VRM controller does not prevent the recovery of the VRM.

However, providing dedicated backup phases to each output of a VRM system, especially if each of those dedicated backup phases is paired with a dedicated VRM controller, can take a significant amount of board space and can be quite expensive. This is particularly true in VRM systems that include several outputs (e.g., a first combination of phases outputting power to a first component and a second combination of phases outputting power to a second component).

For these reasons, there exists a need to of a VRM design that incorporates sufficient failover redundancy while limiting the switching complexity of isolating a failed phase/converter and switching in a backup phase/converter.

SUMMARY

Some embodiments of the present disclosure can be illustrated as a VRM system comprising a first output group that comprises a first primary converter. The VRM system also comprises a second output group that comprises a second primary converter. The VRM system also comprises a first VRM output, a second VRM output, and a first adaptable spare converter. The VRM system also comprises a first switch. Closing the first switch connects the first adaptable spare converter with the first VRM output. The VRM system also comprises a second switch. Closing the second switch connects the first adaptable spare converter with the second VRM output. This VRM system may offer increased redundancy due to the spare converter, but also increased flexibility due to the spare converter's adaptable properties.

Some embodiments of the present disclosure can also be illustrated as the above VRM system with an additional third switch and fourth switch. Opening the third switch disconnects the first primary converter from the first VRM output. Opening the fourth switch disconnects the second primary converter from the second VRM output. This VRM system may offer increased reliability due to being able to isolate either the first primary converter or second primary converter in the event that one of those converters fails.

Some embodiments of the present disclosure can also be illustrated as one of the above VRM systems with a dedicated spare converter in the first output group. This VRM system may increase the ability of the first output group to tolerate a converter failure before an adaptable spare converter is able to be added to the output group.

Some embodiments of the present disclosure can also be illustrated as a method of replacing a primary converter in a VRM. The method comprises detecting a failure of a first primary converter in a first output group in a VRM system. The method also comprises opening a first switch that connects the first converter to a power source based on the detecting. The method also comprises opening a second switch that connects the first converter to a first VRM output based on the detecting. The method also comprises identifying an adaptable spare converter in the VRM system. The method also comprises transmitting a first set of output-power instructions to the adaptable spare converter. The method also comprises closing a third switch that connects the adaptable spare converter to the first VRM output based on the detecting. This method may offer increased redundancy due to the spare converter, but also increased flexibility due to the spare converter's adaptable properties.

Some embodiments of the present disclosure can also be illustrated as the above method of replacing a primary converter in a VRM, with the additional process of closing a fourth switch that connects the adaptable spare converter to a power source. The opening of the second switch occurs after the opening of the first switch and the closing of the third switch occurs after the closing of the fourth switch. This method may increase the of the first output group to tolerate a converter failure before an adaptable spare converter is able to be added to the output group.

Some embodiments of the present disclosure can also be illustrated as the above method of replacing a primary converter in a VRM, with the additional process of determining that the adaptable spare converter is connected to a second VRM output by another switch and opening, based on that determining and prior to closing the third switch, the another switch. This method may beneficially increase the ability to include the adaptable spare converter in load-sharing operations.

Some embodiments of the present disclosure can also be illustrated as a VRM system comprising control-logic circuitry configured to perform the above-described methods of replacing a primary converter in a VRM.

Some embodiments of the present disclosure can also be illustrated as a method of sharing load in a VRM. The method comprises monitoring activity of a first computer component powered by a first VRM output. The method also comprises predicting that the first computer component is likely to experience a high load condition in the future based on the monitoring. The method also comprises identifying an adaptable spare converter. The method also comprises transmitting a first set of output-power instructions to the adaptable spare converter, and closing, based on the identifying, a first switch that connects the adaptable spare converter to the first VRM output. This method may beneficially enable using adaptable spare converters to provide current to VRM outputs during periodic or unexpected high-load conditions, potentially enabling those VRM outputs to be designed with fewer converters.

Some embodiments of the present disclosure can also be illustrated as another embodiment of the above method of sharing load in a VRM. This method also includes detecting a failure of a primary spare converter that is connected to a second VRM output. This method also includes reducing a performance of the first computer component and opening the first switch. This method also includes transmitting a second set of output-power instructions to the adaptable spare converter. This method also includes closing a third switch that connects the adaptable spare converter to the second VRM output. This method may beneficially allow an adaptable spare converter that is being used for load-sharing purposes to be repurposed to replace a failed converter.

Some embodiments of the present disclosure can also be illustrated as a VRM system comprising control-logic circuitry that is configured to perform the above-described methods of sharing load in a VRM.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
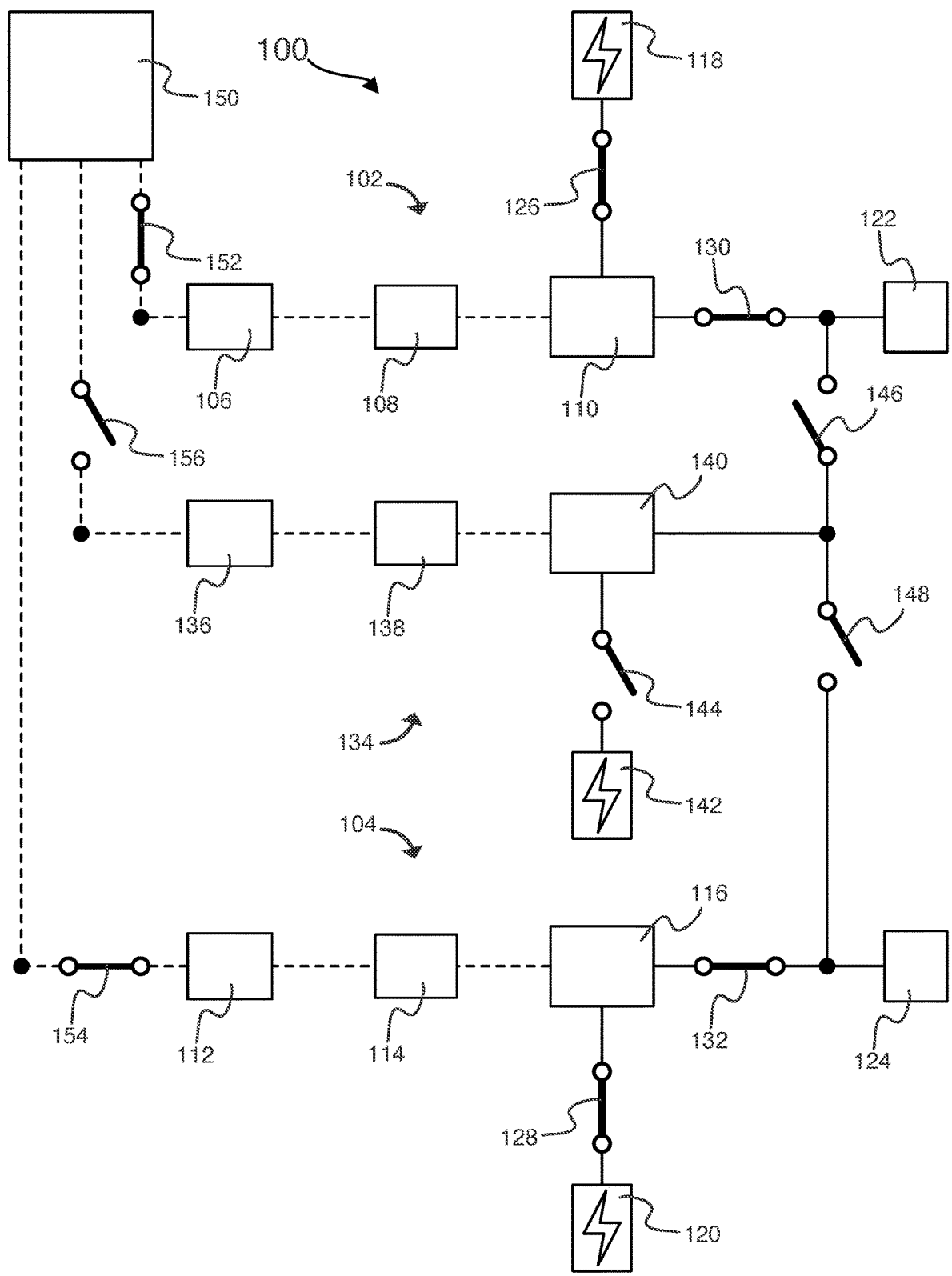
FIG. 1A depicts a first view of a VRM system with two outputs before a failure of a primary converter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to voltage regulation modules, and more specifically, to redundant converters in voltage regulation modules. While the present disclosure is not necessarily limited to such applications, various aspects of the disclosure may be appreciated through a discussion of various examples using this context.

Typical computer systems utilize one or more voltage regulation modules (sometimes referred to herein as "VRMs") to prepare power to meet the requirements of individual components before delivery to those components. Often, this preparation includes accepting input power from a master power source a master power source (e.g., an ATX power supply, an external AC-to-DC converter), adjusting the voltage of that power using a pair of MOSFET switches controlled by the output controller, where an inductor and a capacitor smooth the output signal. The power to the output is provided by the MOSFET alternatively switching on and off with neither being on simultaneously. This switching determines the output voltage and is controlled by a VRM controller. The VRM controller monitors the output of the VRM that is provided to the computer component, and changes the timing of the MOSFET switching based on monitored voltage.

The combination of the MOSFET switch, the inductor, and the capacitor are often referred to as a "phase" or "power phase," and thus the VRM controller can be described as controlling the VRM phase based on the output of the VRM. Some VRMs combine multiple power phases into a single output current that is provided to a component. In these VRMs, the VRM controller typically alternates power phases, switching on a single power phase (i.e., closing the switch of that phase's MOSFET switch) at a single time. In some VRMs, each power phase also includes a dedicated VRM controller, and thus each power phase is independently controlled by a single controller. In these use cases, the combination of a power phase and VRM controller is often referred to as a "converter" or "VRM converter."

Some VRMs provide power to multiple components by providing independent sources of current to those multiple components. In these VRMs, each independent source of current is typically referred to as an "output" of the VRM. Some VRMs, for example, provide power at first voltage to a first component (e.g., a central processor) through a first output and provide power at a second voltage to a second component (e.g., a memory module) through a second output. In these VRMs, each output typically includes an array of one or more phases controlled by a single VRM controller or an array of one or more converters with independent controllers. The VRM components that provide power to an output (typically either an array of phases with a single VRM controller or an array of converters with independent controllers) is often referred to herein as a "VRM output," a "converter group," or an "output group."

Some VRMs provide power to computer components in which the constant uptime of those components, often at very high performance (and thus, very narrow margins for the voltage supplied by the VRM), is particularly important. For example, server systems in enterprise environments, systems in the medical field, safety systems, such as in the aircraft industry or power plants, and military systems often require near 100% uptime. In these computer systems, a failure of a VRM component (e.g., a phase or controller) could prevent the VRM from supplying power to a component within the component's requirements. This could prevent the component from operating at sufficiently high performance, or even prevent the component from functioning at all. Similarly, computer systems in very remote locations (e.g., cell towers, research outposts, satellites in planetary orbit) require high reliability because of the difficulty of servicing failed components. Thus, in these use cases, redundant VRM components are often included in the VRM system to provide spare resources in case a primary VRM component fails.

For example, a VRM may include a output group of one VRM controller and three phases. These phases may be referred to as the output group's primary phases. To provide redundancy, the VRM may also include a spare phase that is not connected to the VRM controller or the output of the VRM output group in normal operation. However, if one of the three primary phases fails (for example, if the capacitor of the fails ruptures), the VRM may isolate the failed primary phase from the VRM controller, power source and output. The VRM may then connect the spare phase to the VRM controller, power source, and output. If these steps are performed quickly enough, the output group can provide continuous power to the respective computer-system component (e.g., CPU core), maintaining the uptime of the component. In typical designs, the VRM may perform these isolating and connecting steps through a set of control logic (e.g., an application-specific integrated circuit) that controls the inputs and outputs of the output groups.

Including redundancy in a VRM can be performed in several ways. As previously discussed, redundant phases (sometimes referred to herein as "spare phases") can be included in a VRM in a system that utilizes phase redundancy. These spare phases may be isolated in a normal mode of operation, but may be connected to the VRM controller, power source, and VRM output if a primary phase malfunctions. Further, in VRMs with multiple outputs, it is sometimes possible for these spare phases to be connected to the output group of any of those multiple outputs. For example, a VRM may contain two output groups: a first output group of 2 phases that outputs power to a memory module, and a second output group of 6 phases that outputs power to a microprocessor. If a phase in the first output group fails, a spare phase could be connected to the VRM, power source, and output of that first output group. If a phase in the second output group fails, however, the spare phase could be connected to the VRM, power source, and output of that second output group.

However, phase redundancy does have disadvantages. Typical VRMs that utilize phase redundancy, for example, feature a single VRM controller for each output group. Thus, while such designs provide redundant mechanisms to address failures of the components within a phase (i.e., a MOSFET switch, inductor, or capacitor), such designs do not, by themselves, address a failure of the VRM controller for an output group. Further, phase-redundancy typically requires complicated switching circuitry to ensure that failed phases are separated from the VRM controller and that spare phases are connected to the VRM controller. In designs in which these spare phases are adaptable (i.e., capable of being connected to any output group), the switching circuitry for the spare phase must typically be repeated for each output group to ensure that the spare phase can be connected with any output group. These complex switching requirements can be problematic because typical computer systems that utilize redundant VRM components also require extremely high uptime, resulting in a need for a failed phase to be isolated and a spare phase to be connected in a very short amount of time. For these reasons, phase redundancy can be insufficient when reliability of the output groups is particularly important, and can be too complicated for VRM designs with more than just a few (e.g., one or two) output groups.

For use cases in which extremely high uptime is important and for which phase redundancy may be overly complicated, it is possible to utilize redundant converters rather than redundant phases. This is sometimes referred to herein as "converter redundancy," and can be particularly applicable in VRM designs in which each phase of an output group (or each phase of each output group) is paired with a dedicated VRM controller. Converter redundancy can be applied in high-uptime use cases by providing one or more dedicated spare converters for each output group. Because each spare converter also provides a spare VRM controller, the output group protected from VRM controller failure as well as failure of a phase component (as opposed to phase redundancy).

However, controller redundancy can also have disadvantages. For example, including a VRM controller for every phase, including each spare phase, can become very expensive if the VRM includes a large number of phases to provide redundancy for or if the number of output groups is large. Further, due to their inclusion of VRM controllers, spare converters take up a greater amount of circuit-board space than spare phases. Particularly if the number of output groups is high, this can make it difficult to design the VRM in a way that allows the VRM components to be sufficiently close to each other and sufficiently close to the power-consuming system components to avoid electrical noise from building up in the output current before delivery.

For these reasons, the disadvantages of typical methods of phase redundancy and converter redundancy can cause both methods to be insufficient for providing VRM redundancy in systems that have high uptime requirements, particularly in systems with a large number of output groups.

Some embodiments of the present disclosure address the disadvantages discussed above by incorporating adaptable spare converters into a VRM design. In some embodiments of the present disclosure, these adaptable spare converters may comprise phase components (e.g., a MOSFET switch, an inductor, a capacitor), a phase isolator to connect the phase to or isolate the phase from a power source and the output group, and a VRM controller to control the phase components. These adaptable spare converters may have the capability to connect with any of the output groups in the VRM. For example, a VRM may contain three output groups, each composed of four primary converters, and three spare converters. Each of these spare converters may be able to connect with any of the three output groups in the VRM. Thus, if each output group experiences one primary converter failure, the VRM could replace the failed primary converter in all three output groups. Similarly, if one output group experiences three primary converter failures, the VRM could replace all three of those primary converter failures. Thus, the embodiments of the present disclosure may achieve an acceptable level of redundancy while avoiding excess expense and board space required to provide dedicated spare converters for every output group.

Some embodiments of the present disclosure may also utilize adaptable spare converters when it is predicted that a computer-system component is likely to require an amount of current that is higher than the corresponding output group is able to provide. For example, an output group of a VRM may be capable of outputting sufficient current to a processor to fulfil the processor's average steady-state operations and typical high-workload operations. However, if an upcoming workload of that processor is predicted to temporarily require higher current than, the output group may be unable to provide power to the processor while meeting the processor's voltage requirement. In these circumstances, one or more spare converters could be connected to the output group in the same way they would be if one or more primary converters of the output group had failed. However, rather than replacing the primary converters, the spare converters would be used to increase the number of converters in the output group. For example, a 6-converter output group could be temporarily increased to an 8-phase output group, increasing the stability of the output power at very high power requirements. By using available spare converters to temporarily meet high power draw, VRMs could be designed with fewer primary converters while still meeting the demands of the system.

FIG. 1A depicts a first view of a VRM system 100 before a failure of a primary converter. VRM system 100 comprises a first output group composed of a single primary converter, converter 102, and a second output group composed of a single primary converter, converter 104. It is of note that the output groups of VRM system 100 each only disclose a single converter in the interests of ease of explanation. In likely implementations, however, a minimum of 2 converters per output group would be preferred. While operating with one converter is possible, a failure of that one converter may result in a system component powered by that output group malfunctioning due to sudden power loss before a spare converter can replace the failed converter. Operating with at least two converters in an output group enables the non-failed converter to provide enough power to keep the output group running until the failed converter is switched out and the spare converter is switched into the output group. The concepts disclosed in FIG. 1A and FIG. 1B could be applicable to a VRM system with output groups with more primary converters, such as output group 404 in FIG. 4 and output groups 502, 504, and 506 of FIG. 5.

Converter 102 comprises VRM controller 106, phase isolator 108, and phase 110. Converter 104, similarly, comprises VRM controller 112, phase isolator 114, and phase 116. VRM controllers 106 and 116 monitor the output voltage of converters 102 and 104 respectively, and control the state of phases 110 and 116 respectively. For example, VRM controllers 106 and 112 could monitor the voltages of feedback loops that are connected to outputs of phases 110 and 116 respectively. Based on those voltages, the VRM controllers 106 and 112 could change the states of MOSFET switches within phases 110 and 116.

Phases 110 and 116 are connected to power sources 118 and 120 respectively. Of note, output groups 102 and 104 are depicted as connected to separate power sources for the sake of simplifying the presentation of VRM 100. In typical embodiments of VRM 100, however, power sources 118 and 120 would derive from the same power supply. While it is possible to source the power for output groups 102 and 104 from different power supplies, any slight deviations between those power supplies may need to be compensated for.

Power sources 118 and 120 provide the current that phases 110 and 116 convert and output to computer system components through outputs 122 and 124 respectively. Phases 110 and 116 are connected to power sources 118 and 120 through switches 126 and 128 respectively, and to outputs 122 and 124 through switches 130 and 132 respectively. Switches 130 and 132 could be anywhere between converters 102 and 104 and 122 and 124 respectively, but may typically be shortly after capacitors located within phases 110 and 132. The states of switches 126 and 130 are controlled by phase isolator 108, and the states of switches 128 and 132 are controlled by phase isolator 114. For example, as illustrated, switches 126 and 130 are in the closed state, connecting phase 110 to power source 118 and output 122. However, if phase isolator 108 opened switch 126, phase 110 (and thus converter 102) would be isolated from power source 118. Further, if phase isolator 108 opened switch 130, phase 110 (and thus converter 102) would be isolated from output 122. Of note, switching the states of switches 128 and 132 would have similar effects on converter 104.

VRM system 100 also comprises a spare converter 134. Spare converter 134 is organized similarly to converters 102 and 104. For example, spare converter 134 comprises VRM controller 136, phase isolator 138, and phase 140. The connection of phase 140 to power source 142 is made by switch 144, the state or which can be controlled by phase isolator 138. However, unlike primary converters 102 and 104, spare converter 134 can be connected to either input 122 or input 124, through switches 146 and 148 respectively, both of which could be controlled by phase isolator 138. Switches 146 and 148 could in theory be located anywhere between phase 140 and outputs 122 and 124 and between switch 130 and output 122 and switch 132 and output 124 respectively.

VRM system 100 also comprises control logic 150. Control logic 150 could be, for example, an ASIC, field-programmable grid array (referred to herein as an "FPGA"), or microprocessor chip. Control logic 150 can monitor the activity of VRM system 100 and control which converters are being used to provide power to outputs 122 and 124. For example, control logic 150 is connected to converter 102 through switch 152, to converter 104 through switch 154, and to spare converter 134 through switch 156. Because switch 152 is closed, for example, control logic 150 can send instructions to converter 102. For example, control logic 150 could send, to VRM controller 106, a target voltage that is required by output 122, as well as PWM instructions, such as a duty cycle at which to switch a MOSFET of phase 110 on and off. Similarly, control logic 150 could send, to phase isolator 108, a command to open and close switches 126 and 130. Commands sent from control logic 150 to phase isolator 108 could flow through VRM controller 106 (e.g., control logic 150 could instruct VRM controller 106 to relay instructions to phase isolator 108), or could bypass VRM controller 106. Thus, even if VRM controller 106 fails, control logic 150 could still send commands to phase isolator 108. Control logic 150 could send commands to converter 104 and spare converter 134 in a similar way as it does to converter 102. For example, by closing switch 156, control logic 150 could send instructions to VRM controller 134 and phase isolator 138.

As illustrated in FIG. 1A, converter 134 is isolated from control logic 150, power source 142, and outputs 122 and 124. Converters 102 and 104, however, are connected to control logic 150 through switches 152 and 154, power sources 118 and 120 through switches 126 and 128, and outputs 122 and 124 through switches 130 and 132. As noted with respect to power sources 118 and 120, power sources 118, 120, and 142, while illustrated as separate blocks, may in fact be connected to the same power supply. It is also of note that electrical connections in FIG. 1A are illustrated as dashed and solid lines for the sake of understanding. Dashed lines, as illustrated, primarily convey instructions and solid lines, as illustrated, primarily convey power. These dashed and solid lines represent electrical connections such as one or more wires. For example, the dashed line between control logic 150, VRM controller 106, and phase isolator 108 may represent a first independent wire between control logic 150 and VRM controller 106 and a second independent wire between control logic 150 and phase isolator 108. In such an embodiment, both these independent wires may be controlled by one switch or two independent switches. In other words, switch 152 could represent two independent switches that control connections to VRM controller 106 and to phase isolator 108 respectively. Finally, intersections between electrical connections that represent wire junctions are represented by black dots.

Figure 1B:
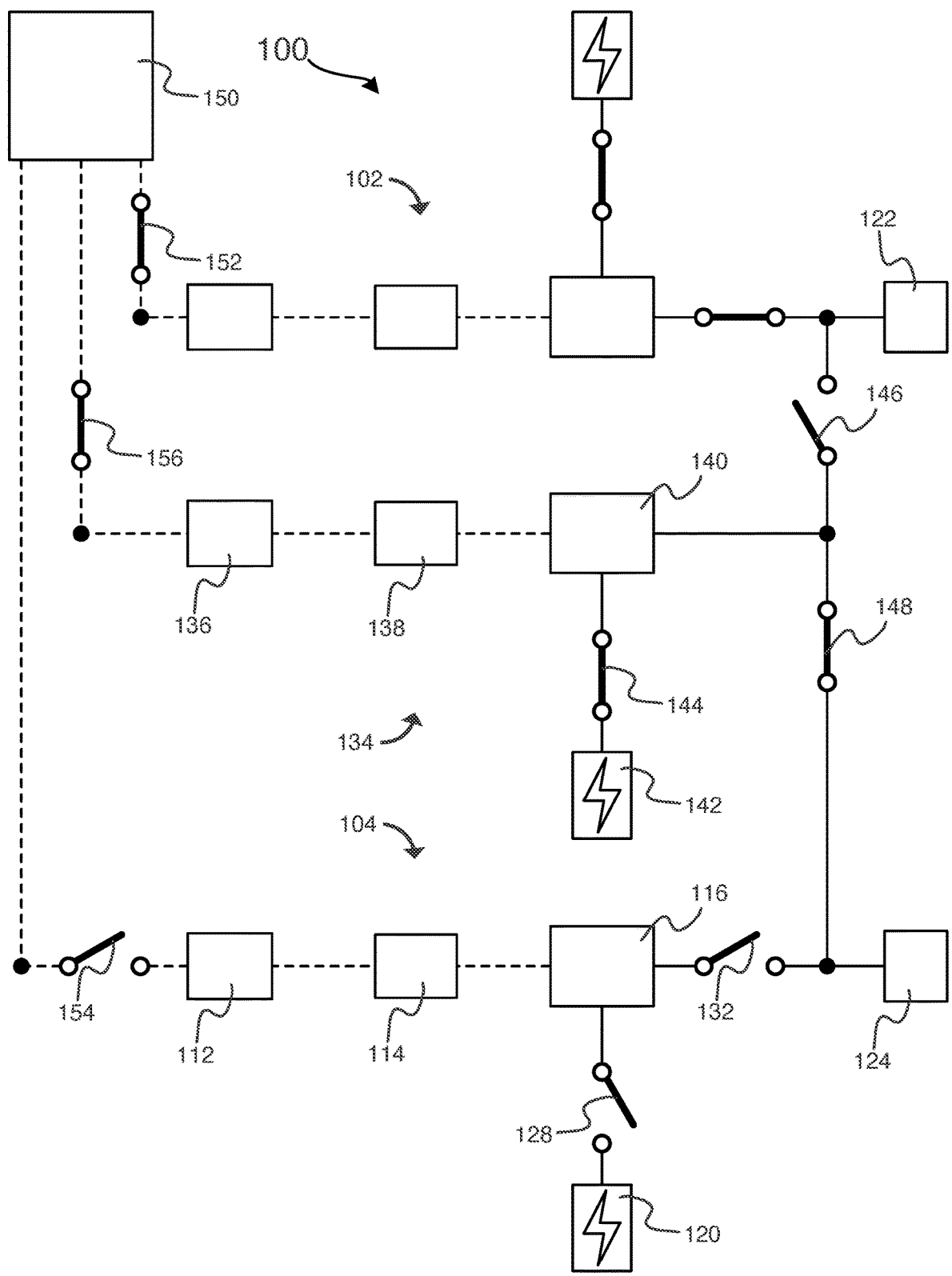
FIG. 1B depicts a second view of the VRM system with two outputs after the failure of a primary converter.

FIG. 1B depicts a second view of VRM system 100 after the failure of primary converter 104. Upon detecting the failure of primary converter 104 (for example, due to failure of VRM controller 112 or phase 116), control logic 150 instructed converter 104, through phase isolator 114, to open switches 128 and 132, isolating converter 104 from power source 120 and output 124. If VRM controller 112 is still functional, control logic 150 may then also update VRM controller 112 (for example, instructing it to stop switching the state of phase 116 and stop attempting to monitor the output voltage of converter 104). Control logic 150 closed switch 154, isolating converter 104.

Upon detecting the failure of primary converter 104, control logic 150 closed switch 156, connecting control logic 150 to spare converter 134. Control logic 150 may also transmit instructions to VRM controller 136. These instructions may include, for example, a voltage to target, a duty cycle at which to switch the state of phase 140, and an instruction to monitor the voltage of a feedback loop connected to the output of spare converter 134. Control logic 150 also instructed converter 134, through phase isolator 138, to close switches 144 and 148, connecting spare converter 134 to power source 142 and output 124 respectively. At this point, VRM controller 136 could then begin switching the state of phase 140 at the instructed duty cycle, and spare converter 134 would have replaced primary converter 104. In some embodiments, control logic 150 may connect spare converter 134 power source 142 before disconnecting phase 116 from output 124. This would allow the current stored in phase 116 (e.g., in an inductor and capacitor) to discharge to output 124 while phase 140 is charging from power source 142, preventing a sudden loss of power to output 124 without a replacement. However, control logic 150 may typically disconnect phase 116 from output 124 before connecting phase 140 to output 124 to avoid an electrical short between phase 140 and phase 116.

This simple switching procedure may provide a benefit over complex switching procedures required for phase redundancy, and may provide the same redundancy as VRM system that takes advantage of dedicated spare converters. Further, in some embodiments, control logic 150 could be permanently connected to converters 102, 104, and 134. In other words, switches 152, 154, and 156 could either always be closed, or could be replaced by one or more wires. This may require control logic 150 to maintain a record of which converter to send PWM instructions to, for example, but may also increase the speed at which a primary converter could be substituted for a spare converter, further increasing the chances that the substitution could occur before any negative impact on system performance.

Figure 2:
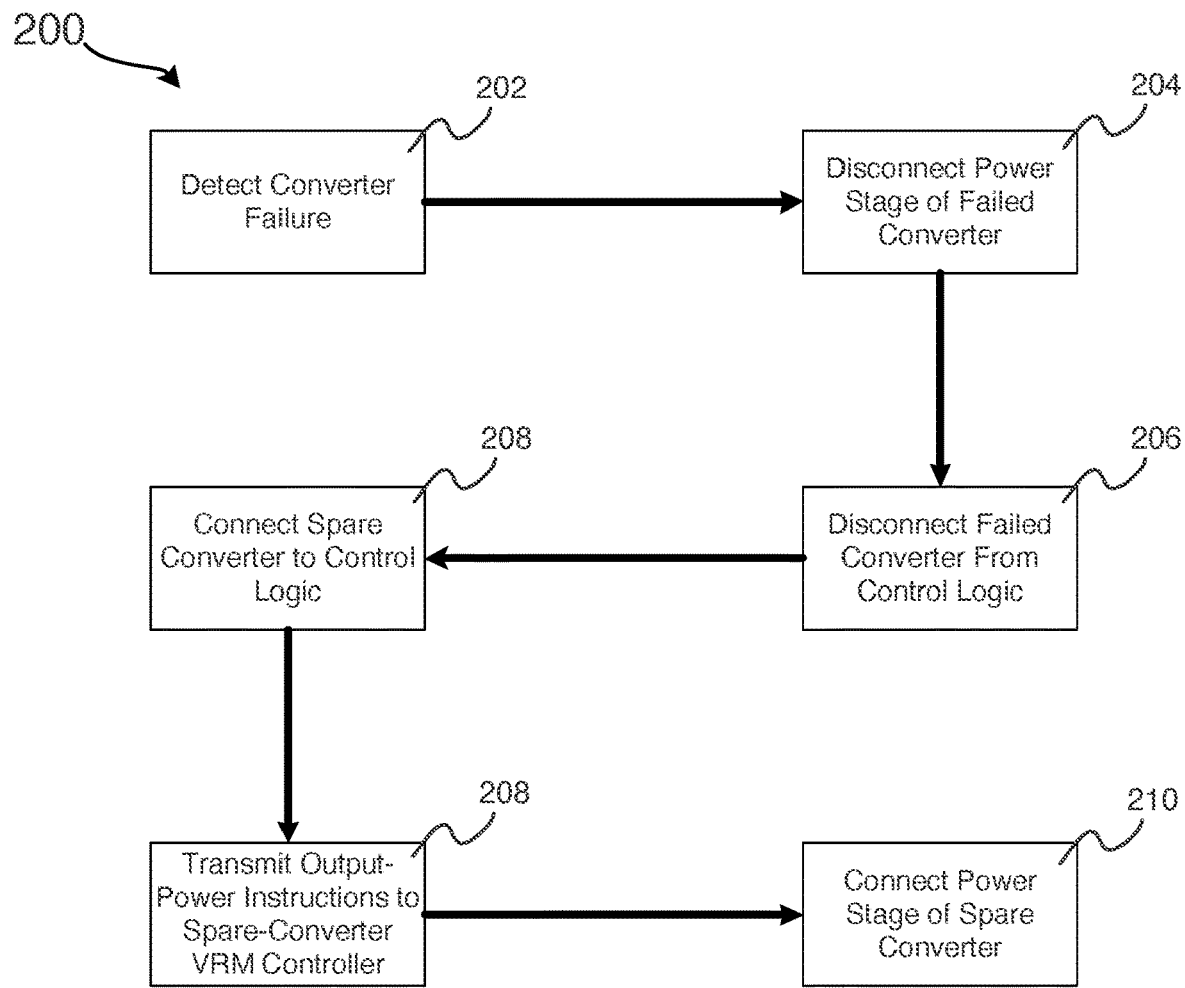
FIG. 2 depicts a method of switching to a spare converter in a VRM system after failure of a primary converter, in accordance with embodiments of the present disclosure.

FIG. 2 depicts a method 200 of switching to a spare converter in a VRM system after failure of a primary converter, in accordance with embodiments of the present disclosure. For example, method 200 may be followed by VRM system 100 between FIGS. 1A and 1B. Method 200 may be performed by a computer controlling a VRM system, such as computer system 801, or by VRM control logic located in the VRM system, such as control logic 150. For the sake of understanding, however, the steps of method 200 will be referred to herein as performed by the "VRM system."

Method 200 begins in block 202, when the VRM system detects a failure of a converter in an output group. In some embodiments, this may represent the failure of a primary converter or of a spare converter that had previously replaced a failed primary converter. This converter failure could be, for example, a VRM controller of the converter or any of the components of the phase of the output group. Upon detecting the failed converter in block 202, the VRM system disconnects the power stage of the failed converter in block 204. This may include, for example, providing instructions to a phase isolator to open a first switch between the power stage and power source and a second switch between the power stage and the output of the output group. This may prevent shorts between the output group and the capacitor or inductor of the failed converter (if, for example, the MOSFET of the power stage failed as a short to ground), and may also prevent uncontrolled power from passing to the output (if, for example, the MOSFET of the power stage shorted to the voltage source).

After disconnecting the power stage of the failed converter in block 204, the VRM system disconnects the converter from the control logic in block 206. This may occur by opening a switch between the control logic and the failed converter. As discussed in relation to FIG. 1B, this operation may not be performed in all embodiments. Maintaining a constant connection between the control logic and all converters (primary and spare) may decrease the time necessary to substitute a spare converter for a primary converter, but may also increase the complexity of sending PWM instructions from the control logic to the converters of the VRM system.

Method 200 also includes connecting a spare converter to control logic in block 208. This may occur by closing a switch between the control logic and the spare converter. Similar to step 206, this may not be performed in some embodiments. Rather, the connection between the control logic and the spare converter may be constant.

Upon connecting the spare converter to the control logic in block 208, the VRM system transmits output-power instructions to the spare converter's VRM controller. These output instructions may include, for example, a target voltage of the converter, a target voltage of the output group, one or more PWM duty cycles for the converter's phase, and a feedback loop from which to monitor output voltage. Method 200 also includes connecting the power stage of the spare converter in operation 210. Operation 210 may include, for example, instructing a phase isolator to close a first switch between the power stage and a power source and to close a second switch between the power stage and the output of the output group in which the converter failure was detected in block 202. In some embodiments, operation 210 may not involve a phase isolator. Rather, operation 210 may involve a control logic unit (e.g., an ASIC or microprocessor) directly opening the first switch and second switch. In some embodiments, this may decrease the time necessary to connect the power stage of the spare converter, thereby decreasing the amount of time necessary to substitute the spare converter for the failed converter.

As illustrated, the operations of method 200 follow a particular order. However, in some implementations these operations could follow various orders not illustrated here. For example, operations 208 through 210 could occur at the same time as operations 204 and 206. Similarly, operations 208 and 210 could also occur simultaneously. Further operation 204 could occur after a first portion of operation 210 (for example, after the power stage of the spare converter is connected to a power source) but at the same time as a second portion of operation 210 (for example, at the same time as the power stage of the spare converter is connected to the output source).

As discussed, some embodiments of the present disclosure may include various designs of spare adaptable converters to provide a mixture of redundancy and flexibility in VRM systems while reducing cost.

Figure 3:
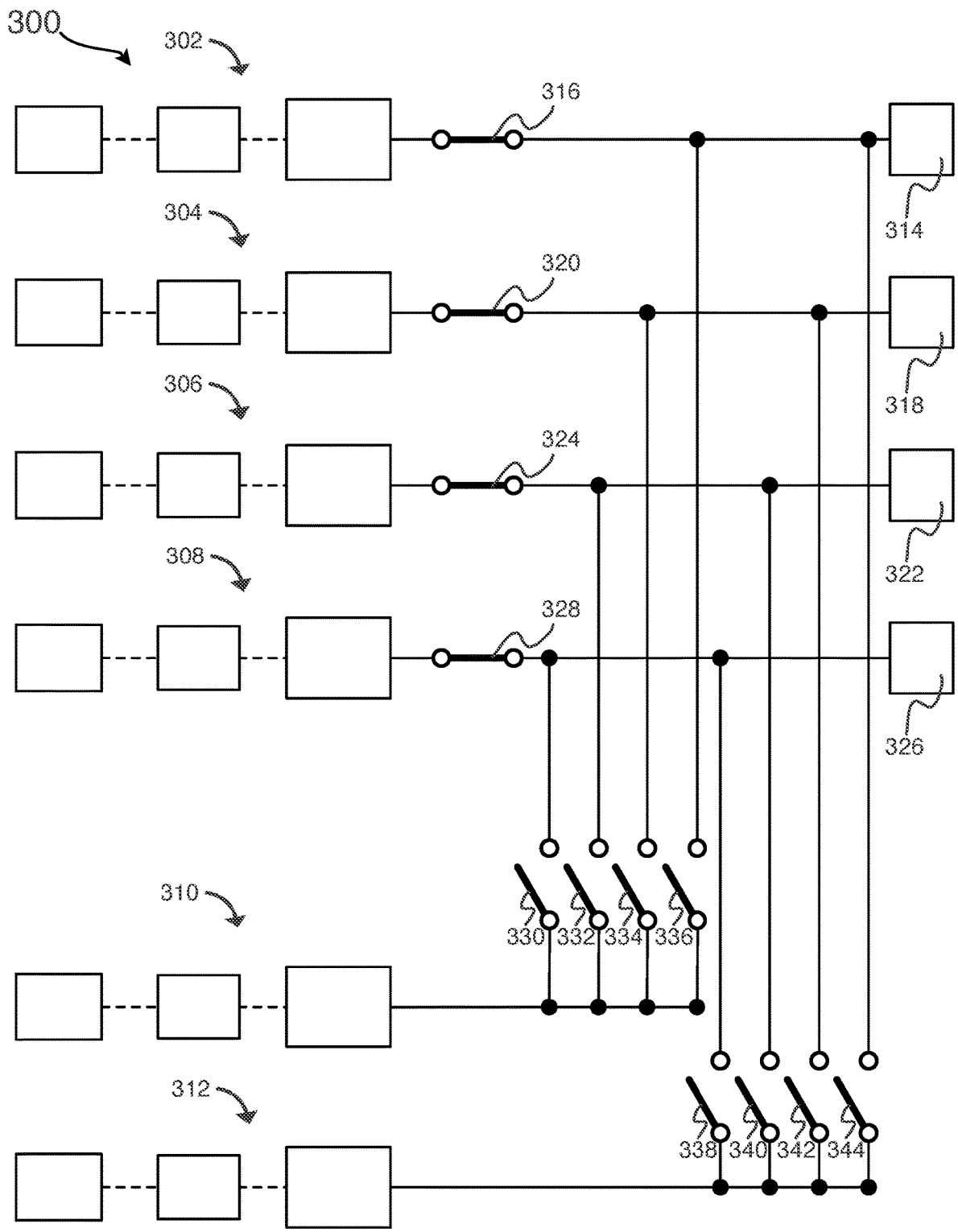
FIG. 3 depicts a set of four output groups and two adaptable spare converters.
Figure 4:
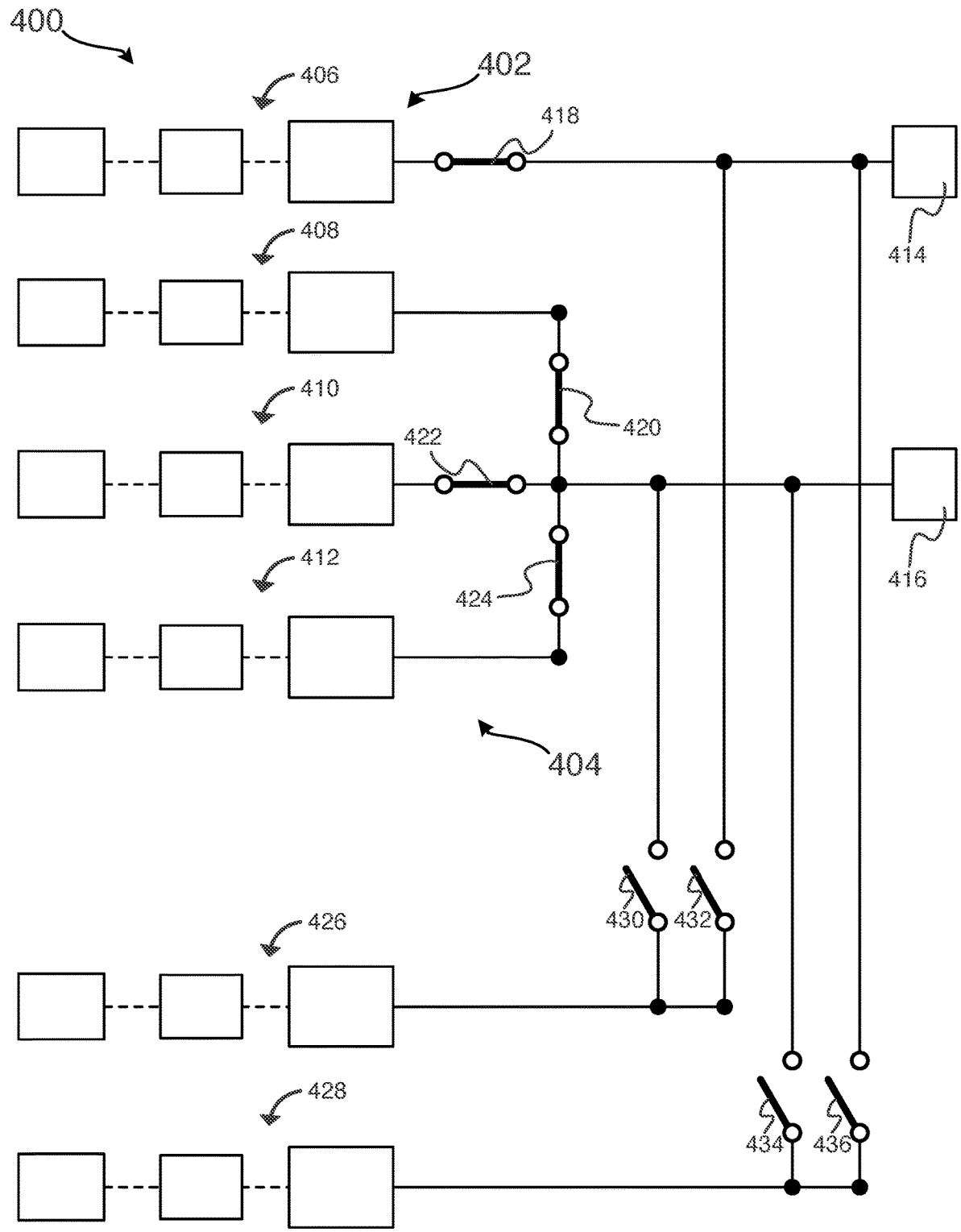
FIG. 4 depicts a VRM system with a multiple-converter output group and adaptable spare converters.

FIG. 3, for example, depicts a VRM system 300 with a set of four output groups (represented by converters 302 through 308) and two adaptable spare converters 310 and 312. As illustrated, each of the output groups of VRM system 300 are represented by a sole converter for the sake of understanding, but each converter 302 through 308 could represent several converters that provide power to the same output. In such embodiments, each of those converters may include their own connections (and switches) to the output group's output, so each converter could be independently isolated from the output group's output. A depiction of such an embodiment is illustrated in FIG. 4. As discussed with respect to FIG. 1A, an output group that is powered by a sole converter would be possible if the system component to which that output group is providing power does not require more than one converter. However, by increasing the number of converters in the output group to at least two, the risk of the component malfunctioning if a converter in that output group fails decreases substantially.

Similarly, several components presented in FIGS. 1A and 1B (e.g., control logic, power sources) are omitted in FIG. 3 for the sake of understanding. However, the connections and switches between converters 302 through 308 and control logic and power sources may resemble that of the connections between the converters, control logic, and power sources of FIGS. 1A and 1B.

Converter 302 is connected to output 314 through switch 316. Switch 316 is depicted as in the "closed" state, allowing power that is regulated by converter 302 to flow to output 314. The state of switch 316 could be controlled by control logic for VRM system 300, either directly or through a phase isolator. For example, if a VRM controller that set the state of a power phase in converter 302 failed while the power phase was charging (e.g., while the MOSFET of the phase is closed), the power phase may charge up to the voltage level of the power source (e.g., 12V), damaging the computer components connected to output 314 (e.g., a microprocessor). On the other hand, if the VRM controller failed while the power phase was not charging (e.g., while the MOSFET of the phase is open), the voltage of the power phase may drop below the requirements of the computer components connected to output 314. Thus, in either of these (or other) failure circumstances, control logic may open switch 316, isolating converter 302 from output 314.

Similarly, converter 304 is connected to output 318 through switch 320, converter 306 is connected to output 322 through switch 324, and converter 308 is connected to output 326 through switch 328. Like switch 316, switches 320, 324, and 328 are illustrated in the "closed" position, connecting their respective converters to the respective outputs. However, the states of any of switches 320, 324, and 328 could be changed by VRM system 300 if a failure of the one of the respective converters was detected, similar to as discussed with regards to switch 316.

As stated, spare converters 310 and 312 are adaptable spares. As such, either of spare converters 310 and 312 could be connected to any of outputs 314, 318, 322, and 326. For example, spare converter 310 is connected to switches 330 through 336. Switch 330 is also connected to output 314, switch 332 is also connected to output 318, switch 334 is also connected to output 322, and switch 336 is also connected to output 326. Similar to spare converter 310, spare converter 312 is connected to outputs 314, 318, 322, and 326 through switches 338 through 344.

As illustrated, all of switches 330 through 336 and switches 338 through 344 are in the "open" state, isolating spare converters 310 and 312 from outputs 314, 318, 322, and 326. However, if one of primary converters 302 through 308 failed, VRM system 300 may isolate that failed converter and substitute it with one of spare converters 310 and 312. For example, if primary converter 302 failed, VRM system 300 could open switch 316 (e.g., through a phase isolator in converter 302), isolating converter 302 from output 314. VRM system 300 may then close switch 336 (e.g., through a phase isolator in converter 310), connecting spare converter 310 with output 314. At this point, spare converter 310 could be used to provide power to output 314 based on instructions provided to a VRM controller in spare converter 310.

Subsequently, if spare converter 310 failed, VRM system 300 may open switch 336, isolating spare converter 310 from output 314. VRM system 300 may then close switch 344, connecting spare converter 312 with output 314. At this point, spare converter 312 could be used to provide power to output 314.

Thus, the embodiment illustrated in FIG. 3 could be used to protect the output groups of VRM system 300 from two converter failures. In the example above, in fact, two converter failures for output 314 occurred, but VRM system 300 was able to continue to provide output 314 with power through adaptable spare converters 310 and 312. Further, because spare converters 310 and 312 are adaptable to any of outputs 314, 318, 322, and 326, this redundancy can be afforded at the financial and board-space expense of only added two converters to the design of VRM system 300, rather than eight converters (i.e., one for each output group).

As discussed, VRM systems 100 and 300 are illustrated with a single converter per output group for the sake of ease of understanding. However, the embodiments of the present disclosure can be applied to VRM systems that include multiple converters in some output groups.

FIG. 4 depicts a VRM system 400 with a multiple-converter output group and adaptable spare converters. The presentation of VRM system 400 has been simplified in a similar way to the presentation of VRM system 300, again for the sake of ease of understanding. However, the embodiments disclosed within FIG. 4 could be incorporated into a VRM system that utilizes core logic, for example, to control the converters that are connected to outputs of the VRM system and the converters that are isolated.

VRM system 400 comprises output groups 402 and 404. Output group 402 provides power to output 414, and output group 404 provides power to output 416. Output group 402 comprises a single converter 406, whereas output group 404 comprises three converters 408, 410, and 412. Output group 402, similar to the output groups disclosed in FIGS. 1A, 1B, and 3, is depicted as including a single converter for the sake of making the presentation of FIG. 4 more understandable. That said, as previously discussed, powering an output group with a single primary converter may make the system component powered by that output group (here, the component connected to output 414) more likely to malfunction due to a sudden power loss if that sole primary converter (here, converter 406) fails. This could be mitigated, as previously discussed, by allowing the inductor of converter 406 discharge while an adaptable spare converter is being switched before isolating converter 406. However, powering each output group with at least two converters, even those output groups that only require one converter to power the corresponding system component, may provide that system component with better protection from sudden power loss.

Thus, the power provided to output 414 from output group 402 is provided by converter 406, which is connected to output 414 through switch 418. The power provided to output 416 from output group 404, however, is provided through a combination of converters 408, 410, and 412, which are connected to output 416 through switches 420, 422, and 424 respectively. For example, the VRM controllers of converters 408, 410, and 412 may operate the power phases of their respective converters such that the combined power of those power phases is within the requirements (e.g., a voltage range) of output 416. For example, the MOSFETs of the power phases may fire in an offset sequence such that only one converter is connected to a power source at any given time, and thus that only one power phase is charging (for example, through an inductor) at any given time.

VRM system also comprises spare converters 426 and 428. Each of spare converters 426 and 428 are adaptable, and can thus connect with output 414 or 416 depending upon the system needs. For example, spare converter 426 can be connected to output 414 through switch 430 and to output 416 through switch 432. Similarly, spare converter 428 can be connected to output 414 through switch 434 and to output 416 through switch 436.

For example, if converters 406 and 408 failed, VRM system 400 may isolate converters 406 and 408 from outputs 414 and 416 by opening switches 418 and 420. VRM system 400 may then close switch 432 to connect spare converter 426 to output 414 and close switch 434 to connect spare converter 428 to output 416, effectively joining spare converter 428 with output group 404. Similarly, if converters 408 and 410 failed, VRM system 400 may open switches 420 and 422 and close switches 430 and 434, isolating failed converters 408 and 410 from output 416 and connecting spare converters 426 and 428 to output 416.

Thus, the embodiment illustrated in FIG. 4 could be used to protect the output groups of VRM system 400 from two converter failures in various combinations. Further, the adaptable nature of spare converters 426 and 428 affords this redundancy without the excess expense and board space of dedicating two spare converters to output group 402 and two spare converters to output group 404.

The depictions within FIGS. 1A, 1B, 3, and 4 provide, as discussed, example embodiments in which the flexibility of adaptable spare converters can be used to provide converter redundancy in a VRM. However, as the number of converters in an output group increases, the difficulty of positioning the adaptable spare converters on the VRM PCB such that the spare converters are close enough to each output group to minimize electrical noise may also increase. Further, as the number of primary converters in the output groups of a VRM increases, the risk that more than one output group in the VRM experiences one or more primary-converter failures may also increase. This may reduce the effective redundancy provided by the adaptable spare converters of the VRM, potentially resulting in a situation in the number of failed primary converters is greater than the number of adaptable spare converters. For example, if, in FIG. 4, primary converters 408 and 410 failed and were replaced by spare converters 426 and 428, VRM 400 would no longer provide any redundancy to converter group 402. In some use cases, however, it may be desirable to always be able to tolerate at least one failure for each output group in the VRM. Thus, in some embodiments, a mixture of dedicated spare converters and adaptable spare converters may be used to achieve a minimum level of redundancy for each output group while still benefitting from the flexibility provided by adaptable spare converters.

Figure 5:
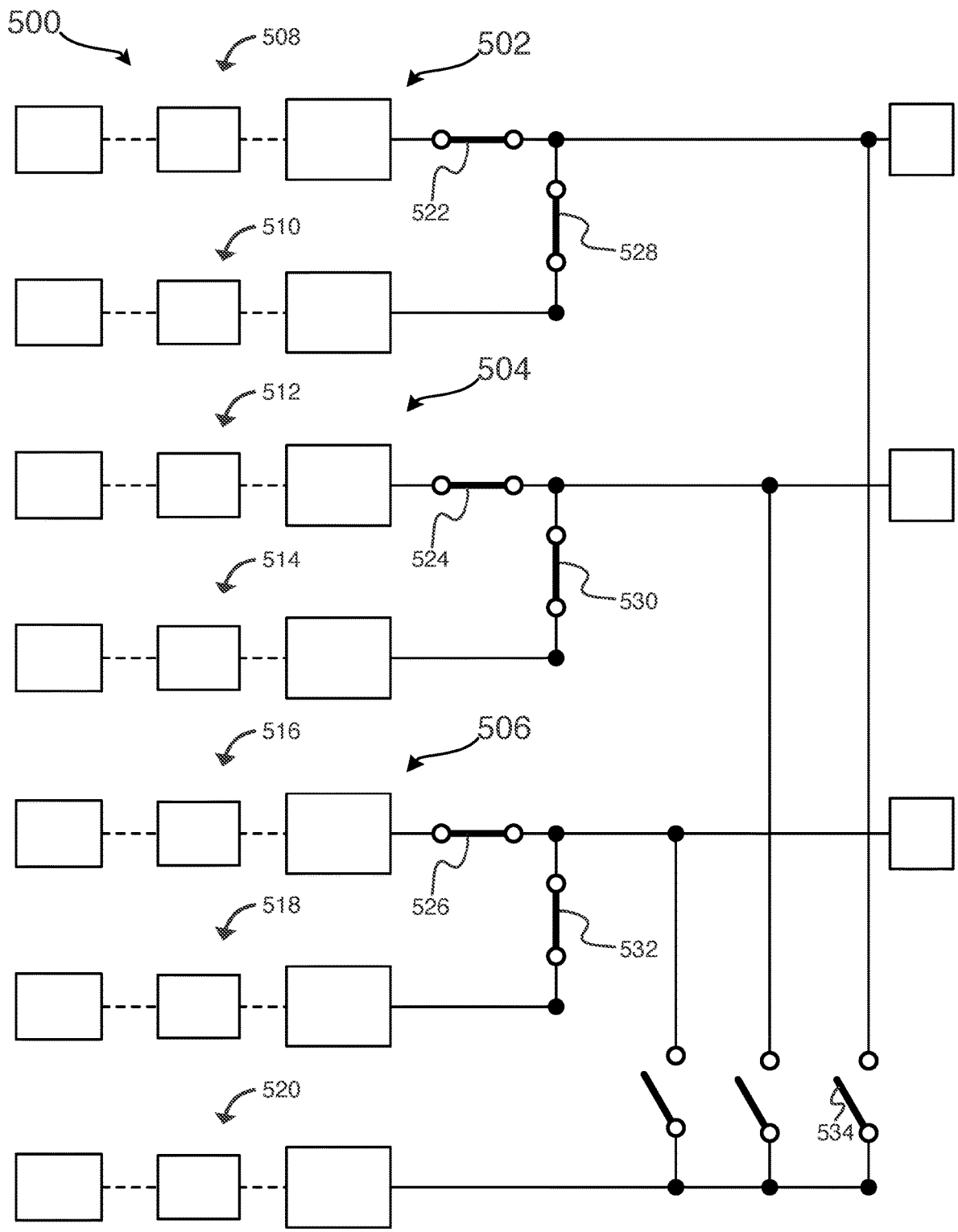
FIG. 5 depicts a VRM system with both dedicated and adaptable spare converters.

FIG. 5 depicts a VRM system 500 with both dedicated and adaptable spare converters. VRM system 500 comprises output groups 502, 504, and 506. Output groups 502, 504, and 506 each power a separate system component that, in standard operation, may only require a single converter. However, each of output groups 502, 504, and 506 feature dedicated redundancy by including both a primary converter and a dedicated spare converter. Output group 502, for example, comprises primary converter 508 and dedicated spare converter 510. Output group 504 comprises primary converter 512 and dedicated spare converter 514. Output group 506 comprises primary converter 516 and dedicated spare converter 518. VRM system 500 also comprises adaptable spare converter 520.

That dedicated spare converters 510, 114, and 118 are dedicated to output groups 502, 504, and 506 respectively may be useful in preventing sudden power loss between the failure of a primary converter (e.g., primary converters 508, 512, and 516). Specifically, because dedicated spare converters 510, 114, and 118 cannot be switched to another output, VRM 500 is not disadvantaged by operating with both the primary converters and dedicated spare converters contributing to the output. For example, VRM 500 could operate output group 502 with both primary converter 508 and dedicated spare converter 510 contributing by keeping switches 522 and 528 closed. By simultaneously utilizing both primary converter 508 and dedicated spare converter 510, output group 502 may still be able to provide sufficient power to a connected system component even after either of primary converter 508 and dedicated spare converter 510 fails.

In this way, both primary converter 508 and dedicated spare converter 510 may function identically before a converter failure, even though the output group would provide sufficient power with only one converter. This may not only prevent the connected system component from malfunctioning when primary converter 508 (or spare converter 510) fails, but may also allow a greater amount of time to switch in an adaptable spare converter after a failure of a converter (either primary or dedicated spare) in an output group. For these reasons, switches 528, 530, and 532 are illustrated as closed, even though the converters they connect/isolate are technically "spare" converters.

Because spare converters 510, 514, and 518 are dedicated to one output group, the placement of those spare converters may, in some implementations, be simpler than if those converters were required to be adaptable to each output group. To illustrate, there is no benefit from spare converter 510 being placed close to output group 506, and thus it may be possible, in some VRM designs, to place spare converter 510 closer to converter 508 than if spare converter 510 were adaptable. Further, VRM 500, as illustrated, comprises four spare converters. In some implementations, it may be difficult to fit four spare converters on the VRM PCB in locations that are sufficiently close to each output group. Thus, by using a mixture of dedicated and adaptable spare converters, VRM 500 may offer, in some use cases, a level of redundancy that would not be possible with solely dedicated spare converters or solely adaptable spare converters.

Further, because spare converters 510, 514, and 518 are dedicated to one output group, each output group 502, 504, and 506 may be capable of operating after a converter failure in that output group. For example, output group 504 would be capable of functioning after converter 512 failed regardless of how many other converters outside of output group 504 failed because spare converter 514 is dedicated to output group 504. In some use cases, this guaranteed redundancy for each output group may be important. For example, in some implementations it may be considered sufficiently likely for each of output groups 502, 504, and 506 to experience a single converter failure that assigning a dedicated spare to each output group is considered worthwhile. However, in some of those implementations it may not be considered sufficiently likely for any of output groups 502, 504, and 506 to have more than one converter failure to justify assigning two dedicated spares to each output group. However, by including adaptable spare 520, VRM 500 provides sufficient redundancy for the event (even if unlikely) that a single output experiences two failures. For example, if primary converter 508 failed, it could be isolated by opening switch 522. Because dedicated spare converter 510 is, as discussed above, already switched in, and because the system component powered by output group 502 only requires one converter, output group 502 could still power that system component after isolating failed converter 508. Further, after isolating failed convert 508, VRM 500 could close switch 534, enabling adaptable spare converter 520 to provide failover redundancy to output group 502. Thus, even if dedicated spare converter 510 failed after primary converter 508 failed, output group 502 could seamlessly operate using adaptable spare converter 520.

As described herein, adaptable spare converters can be beneficially used to provide redundancy for converter failures while reducing expense and limiting the amount of PCB spaced used for VRM converters. However, adaptable spare converters can also be beneficially used to provide an output group with an ability to provide power to a computer component that is experiencing a temporary high load condition (e.g., a processor that is running a particularly intense workload). By adding an adaptable spare converter to an output group temporarily, a VRM may be capable of increasing the ability of that output group to handle such a high load condition. This may be particularly useful, for example, in computer systems in which one or more components typically performs at a steady-state level that requires fewer converters than would be required for high-load condition periodically experienced by that component. For example, a central processing unit (sometimes referred to herein as a "CPU") may only require eight converters to provide a steady voltage during nearly 100% of its operating lifetime. However, that CPU may perform a taxing simulation once every two weeks, during which the CPU draws enough current that nine or ten converters is required to reliably provide a steady voltage to the CPU. During these simulations, the VRM may connect two adaptable spare converters to the output group corresponding to the CPU, and may isolate those adaptable spare converters after the CPU's draw returns to normal levels. By taking advantage of the adaptable spare converters during the rare high load conditions, the VRM may be capable of providing power within the CPU's requirements without the expense of dedicating ten converters to the CPU.

Figure 6:
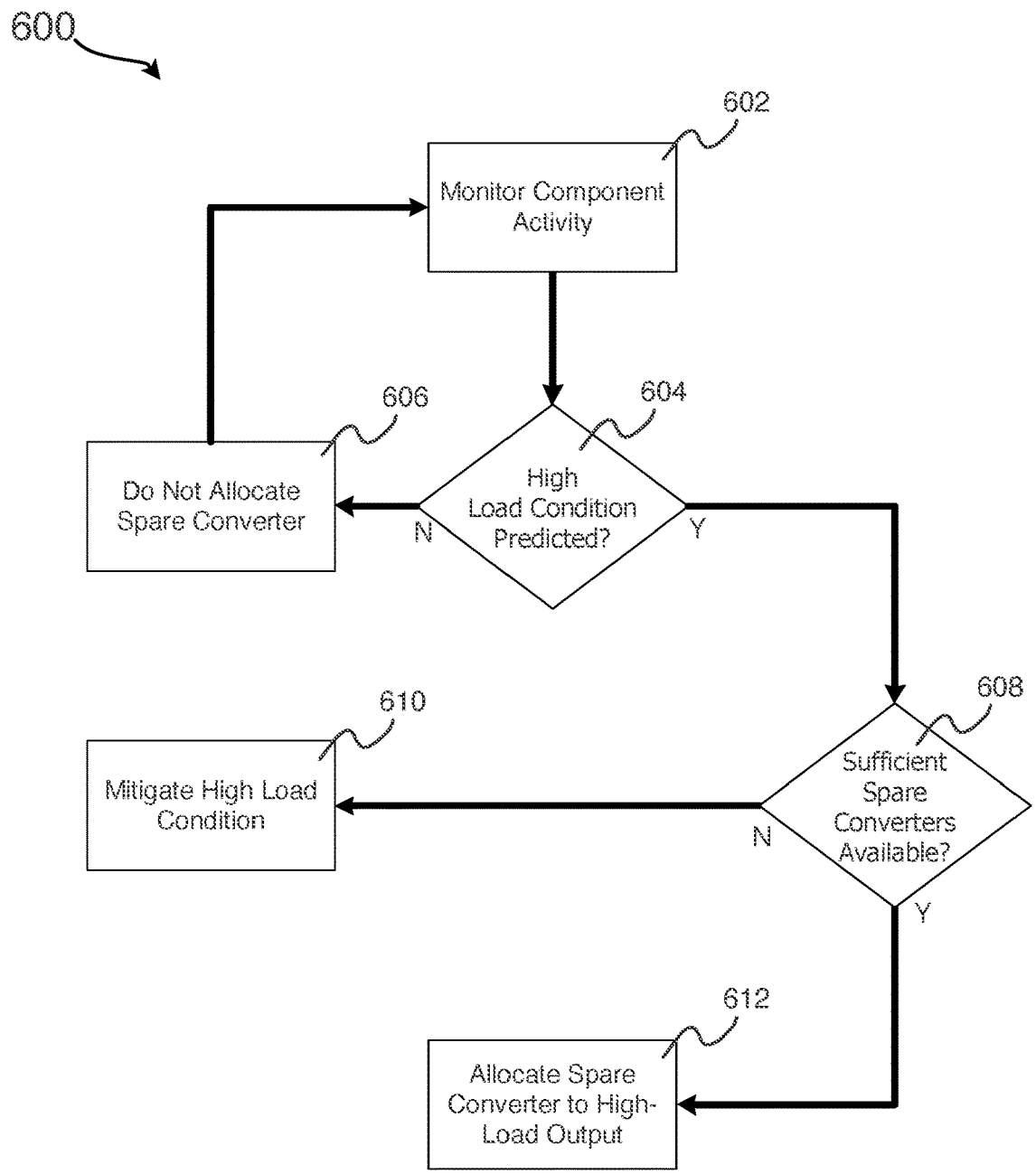
FIG. 6 depicts a method of allocating an adaptable spare converter to support a predicted high-load condition, in accordance with embodiments of the present disclosure.

FIG. 6 depicts a method 600 of allocating an adaptable spare converter to support a predicted high-load condition, in accordance with embodiments of the present disclosure. Method 600 may be performed, for example, by a component on a VRM (e.g., a control logic circuitry, such as a chip) or a component controlling the VRM (e.g., a CPU of the computer system). Method 600 begins in block 602, during which the activity of the component is monitored. Method 600 may include, for example, measuring the current drawn by the component over time, analyzing the activity of the component for patterns that might indicate repeated periodic high load conditions, getting a signal from the system that a high load condition is coming, or analyzing a future duty schedule of the component (e.g., planned updates and workloads). Block 602 may utilize the computer system's CPU, or a machine-learning model that is trained to associate patterns in the component's usage with future high load conditions. Method 600 also includes block 604, in which the monitored activity is analyzed to predict the likelihood of a high load condition occurring in the future (for example, in the next 100 CPU clock cycles, in one week at simulation time).

If block 604 determines that a high load condition is not predicted, method 600 proceeds to block 606, in which the VRM does not allocate an adaptable spare converter to support the component, and continues to power the component with the standard output group. From block 606, method 600 proceeds back to block 602.

However, if block 604 determines that a high load condition is predicted, method 600 proceeds to block 608, in which the VRM is analyzed to determine whether any spare converters (e.g., adaptable spare converters) are available to add to the output group to support the high-load condition. Using VRM 400 from FIG. 4 as an example, output 416 may be predicted to experience a high load condition in the imminent future, and thus output group 404 may require an added converter to support the high-load condition. Control-logic circuitry on VRM 400 may analyze, in block 608, whether adaptable spare converters 426 and 428 are available to be temporarily added to output group 404.

If it is determined, in block 608, that insufficient spare converters are available, method 600 proceeds to block 610 in which the computer system attempts to mitigate the high-load condition. This may occur, for example, if one or more of the adaptable spare converters of the VRM are already allocated. Returning to the previous example utilizing VRM 400, the computer system may predict that output group 404 requires two additional converters to reliable provide power to output 416 during the high load condition. However, if adaptable spare converter 426 is already being used to replace failed converter 406, only one spare converter (adaptable spare converter 428) may be available to assist output group 404. Similarly, if both spare converters 426 and 428 are replacing failed primary converters, no spare converters may be available.

In these situations, mitigating the high load condition in block 610 may vary based on the circumstances. In some instances, for example, it may be necessary to alter the planned workload of the computer component to reduce the load required. For example, if the high load condition is due to a processor running an intensive simulation, the computer system may deliberately reduce the speed at which the simulation is performed in order to reduce the load requirement of the processor. In some circumstances, however, reducing the load may not be possible. In these situations, however, it may be possible to reduce the load of other components to which an adaptable spare converter has been allocated.

Using VRM 400 as an example again, block 606 may have predicted that output 414 will experience a high load condition, and that output group 402 would be unable to supply power that meets output 414's current-range requirements without an additional converter being added to the output group. However, both of adaptable spare converters 426 and 428 may be connected to output group 404 due to failures in primary converters 410 and 412. In this circumstance, mitigating the high load condition may actually include capping the performance of output 416 during the high load condition of output 414 such that output 416 can be supplied power by only converters 408 and 426. This would free up spare converter 428 to be connected to output group 402.

In some circumstances, unfortunately, it may not be desirable, feasible, or even possible to reduce the output of any computer components or free up spare converters to assist with the high load condition predicted in block 604. In these circumstances, mitigating the high load condition may simply refer to allowing the high load condition to occur without allocating spare converters to assist, risking component failure (e.g., failure of the simulation to run, safety shutdown of the component).

If, on the other hand, it is determined in block 608 that spare converters are available, those spare converters are allocated to the output group supplying the output in block 612. For example, if output 416 is expected to experience a high load condition, adaptable spare converters 426 and 428 could be temporarily added to output group 404 during the high load condition.

This may allow VRM 400 to supply the necessary power to output 416 during occasional high load conditions without requiring the added expense of designing and manufacturing VRM 400 with five primary converters in output group 400. In some embodiments, this method may also be utilized to allow a computer component to boost to a steady-state performance above that which would be possible with the primary converters supporting that component. For example, output 414 may operate at higher performance when supported by two converters. In this example, adaptable spare converter 426 may be added to output group 402 during regular operations of the computer system. However, if, for example, output group 404 experiences two converter failures, both adaptable spare converters 426 and 428 may be necessary to support output 416. In this case, adaptable spare converter 426 may be disconnected from output group 402 and added to output group 404, in which case the performance of the component corresponding to output 414 could be reduced.

In some circumstances, however, allocating adaptable spare converters to assist with load sharing (e.g., a periodic high load condition or increasing the performance of a component) may complicate assigning spare converters to replace failed converters. As such, some circumstances may require methods to address these complications.

Figure 7:
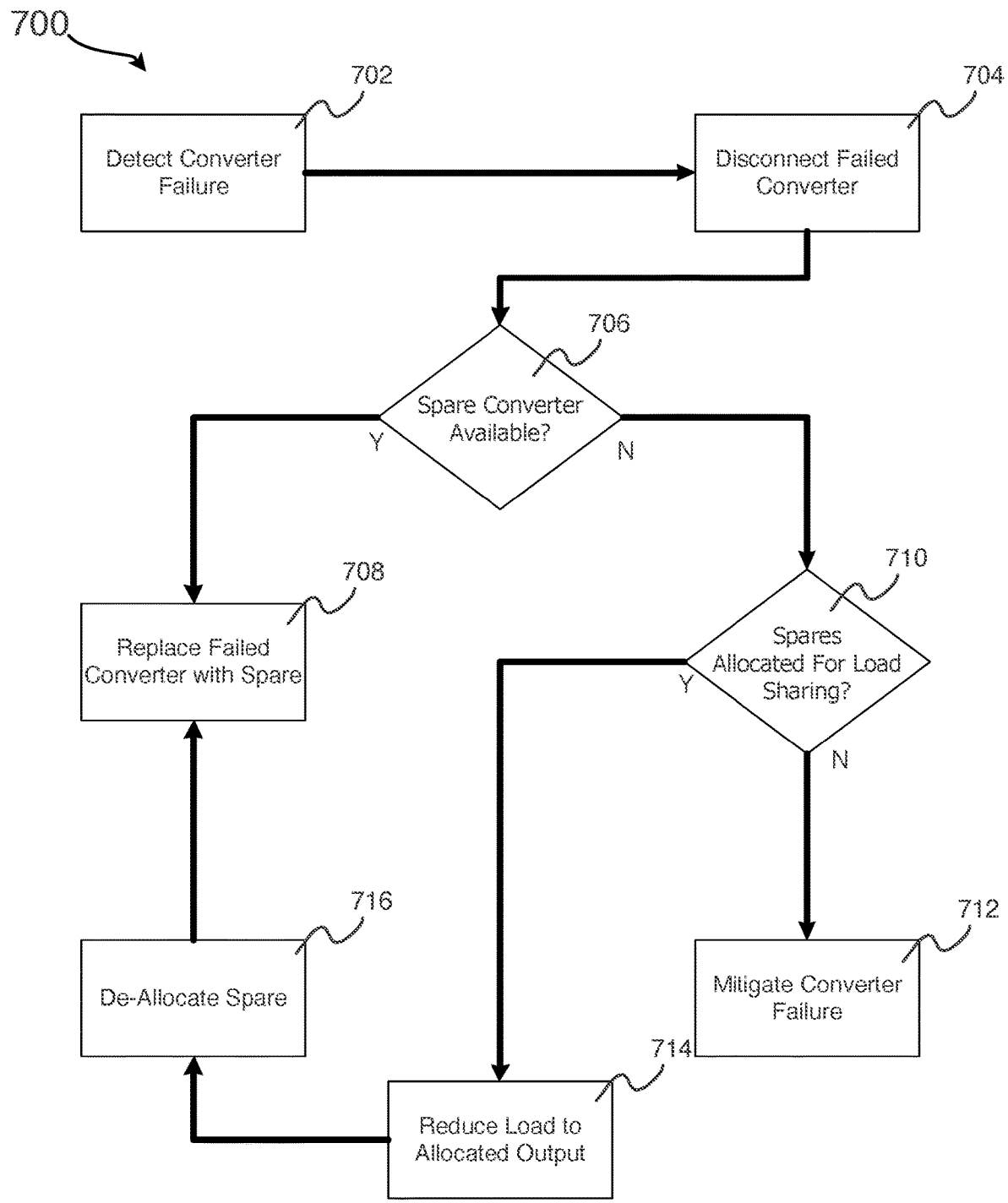
FIG. 7 depicts a method of replacing a failed primary converter with a spare converter that was allocated to support a predicted high-load condition, in accordance with embodiments of the present disclosure.

FIG. 7 depicts a method 700 of replacing a failed primary converter with a spare converter that was allocated for load sharing purposes, in accordance with embodiments of the present disclosure. Method 700 begins in block 702, in which a converter failure is detected. Block 702 could be performed, for example, using methods similar to that of block 202 of method 200 in FIG. 2. Method 700 then proceeds to disconnect the failed converter in block 704, which could be performed, for example, using methods similar to that of block 204 of method 200 in FIG. 2.

Method 700 then determines, in block 706, whether a spare converter is available to replace the failed converter. This may include, for example, determining whether the output group that experienced the failed converter includes unused dedicated spare converters, and if the VRM includes unused adaptable spare converters.

If, for example, a control-logic chip determines, in block 706, that a spare converter is available, it replaces the failed converter with the spare converter in block 708. However, if it is determined that a spare converter is not available, the VRM is analyzed to determine, in block 710, whether any adaptable spare converters have been allocated for load sharing. Load sharing, as used herein, may refer to adding a converter to an output group to accommodate a high load condition or to increase the performance of a component supported by the output group.

If method 700 determines, in block 710, that no spare converter have been allocated for load sharing, the method proceeds to block 712 in which the converter failure is mitigated. The procedures of block 712 may vary depending on the circumstances, but may resemble the methods of block 610 of method 600. For example, block 712 may include determining whether the workloads of any components supported by an adaptable spare converter could be reduced enough to free up that adaptable spare converter to replace the failed converter. In other circumstances, block 712 may include reducing the performance of the component supported by the output group that experienced the converter failure.

If, on the other hand, method 700 determines, in block 710, that a spare converter has been allocated for load sharing, method 700 proceeds to block 714, in which the load to the component supported by the output group to which that spare converter has been allocated is reduced. For example, if a converter failure in output group 402 of VRM 400 is detected in block 702, but both adaptable spare converters 426 and 428 are allocated to block 404 to increase the component corresponding to output 416, the performance of that component may be reduced, allowing spare converter 428 to be disconnected from output group 404.

The allocated spare converter may then be de-allocated in block 716 and used to replace the failed converter in block 708.

Figure 8:
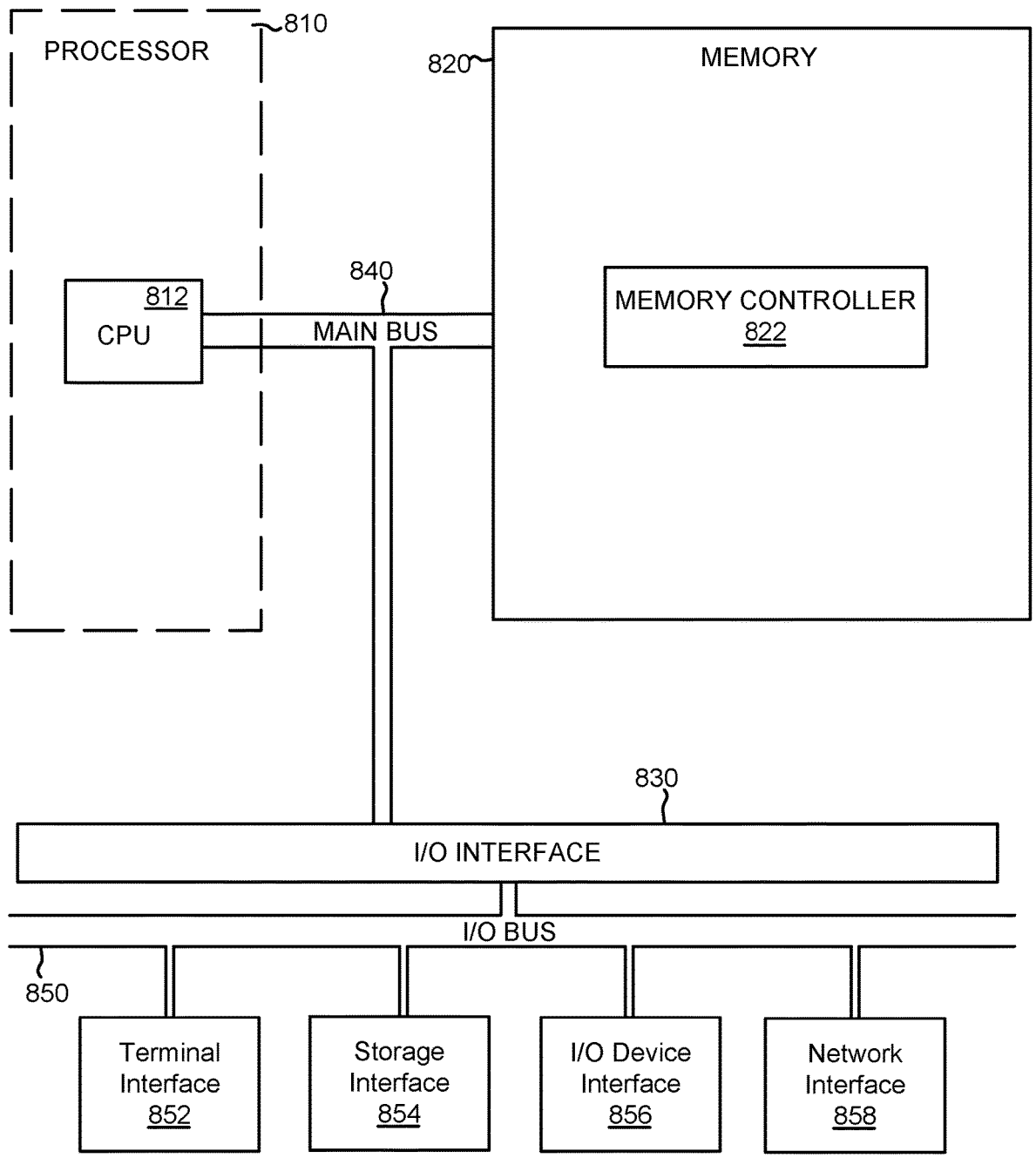
FIG. 8 depicts the representative major components of a computer system that may be used in accordance with embodiments.

FIG. 8 depicts the representative major components of an example Computer System 801 that may be used in accordance with embodiments of the present disclosure. The particular components depicted are presented for the purpose of example only and are not necessarily the only such variations. The Computer System 801 may include a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may include one or more CPUs 812. The Processor 810 may additionally include one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may include one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may include a Memory Controller 822 and one or more memory modules for temporarily or permanently storing data (not depicted). In some embodiments, the Memory 820 may include a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may include an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may include the Terminal Interface 852, the Storage Interface 854, the I/O Device Interface 856, and the Network Interface 858. In some embodiments, the various interfaces may include a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A VRM system comprising:
   VRM control logic circuitry;
   a first output group that comprises a first primary converter;
   a second output group that comprises a second primary converter;
   a first VRM output and a second VRM output;
   a first adaptable spare converter, wherein the first adaptable spare converter comprises a single VRM controller and a single phase and wherein the single VRM controller monitors a voltage of a feedback loop of the single phase;
   a first switch, wherein closing the first switch connects the first adaptable spare converter with the first VRM output;
   a second switch, wherein closing the second switch connects the first adaptable spare converter with the second VRM output; and
   a third switch, wherein closing the third switch enables the VRM control logic circuitry to send instructions to the first adaptable spare converter;
   wherein the single VRM controller within the first adaptable spare converter does not control the first switch, second switch, or third switch.

2. The VRM system of claim 1, further comprising:
   a fourth switch, wherein opening the fourth switch disconnects the first primary converter from the first VRM output; and
   a fifth switch, wherein opening the fifth switch disconnects the second primary converter from the second VRM output.

3. The VRM system of claim 1, further comprising:
   VRM control logic circuitry;
   a fourth switch, wherein closing the fourth switch enables the VRM control logic circuitry to send instructions to the first primary converter;

a fifth switch, wherein closing the fifth switch enables the VRM control logic circuitry to send instructions to the second primary converter.

4. The VRM system of claim 1, wherein the first output group further comprises a dedicated spare converter.

5. A method comprising:
   detecting, in a VRM system, a failure of a first primary converter in a first output group;
   opening, based on the detecting, a first switch that connects the first converter to a first power source;
   opening, based on the detecting, a second switch that connects the first converter to a first VRM output;
   identifying an adaptable spare converter in the VRM system, wherein the adaptable spare converter comprises a single VRM controller and a single phase and wherein the single VRM controller monitors a voltage of a feedback loop of the single phase;
   closing, based on the detecting, a third switch, wherein closing the third switch enables the VRM control logic circuitry to send instructions to the first adaptable spare converter;
   transmitting a first set of output-power instructions to the adaptable spare converter; and
   closing, based on the detecting, a fourth switch that connects the adaptable spare converter to the first VRM output;
   wherein the single VRM controller within the adaptable spare converter does not control the third switch or the fourth switch.

6. The method of claim 5, further comprising closing a fifth switch that connects the adaptable spare converter to a second power source;
   wherein the opening of the second switch occurs after the opening of the first switch and wherein the closing of the fourth switch occurs after the closing of the fifth switch.

7. The method of claim 6, wherein the first power source and the second power source are the same power source.

8. The method of claim 5, further comprising:
   determining that the adaptable spare converter is connected to a second VRM output by a fifth switch; and
   opening, based on the determining and prior to the closing of the fourth switch, the fifth switch.

9. The method of claim 8, further comprising reducing a performance of a computer component that is provided power by the second output.

10. The method of claim 5, further comprising:
    detecting, in the VRM system, a failure of a second primary converter in a second output group;
    reducing, based on the detecting the failure of the second primary converter, a performance of a computer component that is provided power by the second output group;
    opening the fourth switch;
    transmitting a second set of output-power instructions to the adaptable spare converter; and
    closing a fifth switch that connects the adaptable spare converter to the second output group.

11. A VRM system comprising control-logic circuitry configured to perform a method, the method comprising:
    detecting, in the VRM system, a failure of a first primary converter in a first output group;
    opening, based on the detecting, a first switch that connects the first converter to a first power source;
    opening, based on the detecting, a second switch that connects the first converter to a first VRM output;
    identifying an adaptable spare converter in the VRM system, wherein the adaptable spare converter comprises a single VRM controller and a single phase and wherein the single VRM controller monitors a voltage of a feedback loop of the single phase;
    closing, based on the detecting, a third switch, wherein closing the third switch enables the VRM control logic circuitry to send instructions to the first adaptable spare converter;
    transmitting output-power instructions to the adaptable spare converter; and
    closing, based on the detecting, a fourth switch that connects the adaptable spare converter to the first VRM output;
    wherein the single VRM controller within the adaptable spare converter does not control the third switch or the fourth switch.

12. The VRM system of claim 11, wherein the method further comprises closing a fifth switch that connects the adaptable spare converter to a second power source;
    wherein the opening of the second switch occurs after the opening of the first switch and wherein the closing of the fourth switch occurs after the closing of the fifth switch.

13. The VRM system of claim 12, wherein the first power source and the second power source are the same power source.

14. The VRM system of claim 11, wherein the method further comprises:
    determining that the adaptable spare converter is connected to a second VRM output by a fifth switch; and
    opening, based on the determining and prior to the closing of the fourth switch, the fifth switch.

15. The VRM system of claim 14, wherein the method further comprises reducing a performance of a computer component that is provided power by the second output.

16. The VRM system of claim 11, wherein the method further comprises:
    detecting, in the VRM system, a failure of a second primary converter in a second output group;
    reducing, based on the detecting the failure of the second primary converter, a performance of a computer component that is provided power by the second output group;
    opening the fourth switch; and
    closing a fifth switch that connects the adaptable spare converter to the second output group.

17. A method comprising:
    monitoring activity of a first computer component powered by a first VRM output;
    predicting, based on the monitoring, that the first computer component is likely to experience a high load condition in the future;
    identifying an adaptable spare converter, wherein the adaptable spare converter comprises a single VRM controller and a single phase and wherein the single VRM controller monitors a voltage of a feedback loop of the single phase;
    closing, based on the detecting, a first switch, wherein closing the first switch enables the VRM control logic circuitry to send instructions to the first adaptable spare converter;
    transmitting a first set of output-power instructions to the adaptable spare converter; and
    closing, based on the identifying, a second switch that connects the adaptable spare converter to the first VRM output;

wherein the single VRM controller within the adaptable spare converter does not control the first switch or the second switch.

18. The method of claim 17, further comprising:
   determining that the adaptable spare converter is connected to a second VRM output by a third switch; and
   opening, based on the determining and prior to the closing of the second switch, the third switch.

19. The method of claim 18, further comprising reducing a performance of a second computer component that is provided power by the second output.

20. The method of claim 17, further comprising:
   detecting a failure of a primary spare converter that is connected to a second VRM output;
   reducing a performance of the first computer component;
   opening the second switch;
   transmitting a second set of output-power instructions to the adaptable spare converter; and
   closing a third switch that connects the adaptable spare converter to the second VRM output.

21. A VRM system comprising control-logic circuitry configured to perform a method, the method comprising:
   monitoring activity of a first computer component powered by a first VRM output;
   predicting, based on the monitoring, that the first computer component is likely to experience a high load condition in the future;
   identifying an adaptable spare converter, wherein the adaptable spare converter comprises a single VRM controller and a single phase and wherein the single VRM controller monitors a voltage of a feedback loop of the single phase;
   closing, based on the detecting, a first switch, wherein closing the first switch enables the VRM control logic circuitry to send instructions to the first adaptable spare converter;
   transmitting a first set of output-power instructions to the adaptable spare converter; and
   closing, based on the identifying, a second switch that connects the adaptable spare converter to the first VRM output;
   wherein the single VRM controller within the adaptable spare converter does not control the first switch or the second switch.

22. The VRM system of claim 21, wherein the method further comprises:
   determining that the adaptable spare converter is connected to a second VRM output by a third switch; and
   opening, based on the determining and prior to the closing of the second switch, the third switch.

23. The VRM system of claim 22, wherein the method further comprises reducing a performance of a second computer component that is provided power by the second output.

24. The VRM system of claim 21, wherein the method further comprises:
   detecting a failure of a primary spare converter that is connected to a second VRM output;
   reducing a performance of the first computer component;
   opening the second switch;
   transmitting a second set of output-power instructions to the adaptable spare converter; and
   closing a third switch that connects the adaptable spare converter to the second VRM output.

* * * * *